United States Patent [19]

Johnson

[11] Patent Number: 4,707,001

[45] Date of Patent: Nov. 17, 1987

[54] LINER CONNECTION

[75] Inventor: Frederick W. Johnson, Bessemer, Ala.

[73] Assignee: Seal-Tech, Inc., Bessemer, Ala.

[21] Appl. No.: 876,712

[22] Filed: Jun. 20, 1986

[51] Int. Cl.$^4$ .............................................. F16L 15/00
[52] U.S. Cl. ................................. 285/332.3; 285/334; 285/355
[58] Field of Search ............ 285/334, 333, 355, 332.3, 285/332.2, 390, 391; 411/412, 413

[56] References Cited

U.S. PATENT DOCUMENTS

| | | |
|---|---|---|
| 3,355,192 | 11/1967 | Kloesel, Jr. et al. ............ 285/334 X |
| 3,359,013 | 12/1967 | Knox et al. ....................... 285/334 X |
| 3,508,771 | 4/1970 | Duret ................................. 285/355 X |
| 3,667,784 | 6/1972 | Hokanson et al. ............... 285/334 X |
| 4,489,963 | 12/1984 | Raulins et al. .................... 285/334 X |
| 4,494,777 | 1/1985 | Duret ................................. 285/334 X |
| 4,564,225 | 1/1986 | Taylor .............................. 285/390 X |
| 4,591,195 | 5/1986 | Chelette et al. ................. 285/334 X |

FOREIGN PATENT DOCUMENTS

| | | | |
|---|---|---|---|
| 1300262 | 6/1952 | France ................................. 285/334 |
| 866996 | 5/1961 | United Kingdom ................ 285/334 |

Primary Examiner—Thomas F. Callaghan
Attorney, Agent, or Firm—Jennings, Carter, Thompson & Veal

[57] ABSTRACT

A connection for plain end well liner pipe and the like uses a threaded pin and box having a locking reverse angle thread profile to prevent radial separation of the pin and box due to deep well pressure and make-up pressures. The connection includes a primary internal seal structure wherein a metal-to-metal interference seal is located adjacent a thermoplastic ring seal. Separation of the interference seal due to the proximity of the thermoplastic seal is prevented by the locking thread profile. An external seal uses a metal-to-metal interference seal enhanced by a locking torque shoulder seal which acts with the thread profile to prevent radial separation of the interference seal.

19 Claims, 6 Drawing Figures

LINER CONNECTION

FIELD OF THE INVENTION

The present invention relates to the joinder of tubular members such as may be found in oil and gas well tubing or casing liners. More particularly the present invention relates to the joinder of such members in high pressure environments associated with deep formation wells wherein extremely high pressures are encountered. In even greater particularity the present invention may be described as a multi-seal multi-thread pin and box type connection which combines interference seals and thermoplastic seals without sacrificing the integrity of either seal.

BACKGROUND OF THE INVENTION

As is well known in the industry, the search for oil and gas has required drilling wells in excess of 20,000 feet and into zones of extremely high pressure and corrosive environments. Consequently, there have been numerous improvements in well liner connection, which must occur every thirty to forty feet into the well, thus relegating the simple threaded connection of earlier times to small scale operations in shallow formations. The time, inconvenience and expense of removing the string of pipe to replace a seal which has failed at some depth greater than 10,000 feet is readily apparent.

By way of example, metal-to-metal pressure seals were first disclosed in U.S. Pat. No. 2,006,520 wherein a seal surface formed on the male end of a pin of a tube cooperates with a seal surface formed in the female or box portion of the joinder tube to effect a seal just prior to shouldering of the threaded connection. This basic metal-to-metal seal provided an effective seal; however there was no back-up seal and the seal surfaces were subject to contamination, pitting due to storage deterioration, and damage occurring during handling of the tubing.

U.S. Pat. No. 3,489,437 disclosed two adjacent metal-to-metal seals formed at a shoulder within the female member. While the dual seal is an improvement, this arrangement is susceptible to degradation of the seal performance due to contamination or deterioration of the seal surfaces.

Teflon seal elements or other thermoplastic seal elements have been used as back-up sealing elements when compressed in the connection; however these type elements typically resist radial compression and therefore tend to impart internal forces within the connection which act to urge the male and female elements apart thus reducing the effectiveness of the metal-to-metal seals and may contribute to hydrogen sulfide corrosion failures which are often associated with high stress levels in the metal connection.

Numerous seal arrangements are in existence; however, none are known to present the particular combination claimed herein.

SUMMARY OF THE INVENTION

It is an object of the present invention to provide a multi-seal connection between tubular members which is resistant to pressures and corrosive effects found at substantial drilling depths.

Another object of the invention is to provide a multi-seal connection which can incorporate a thermoplastic seal without degradation of the metal-to-metal seals and without inducing failure causing stress in the joint.

Another object of the invention is to provide a connection which has sealing capacity in excess of the rated burst capacity of the tubular members.

Yet another object of the invention is to provide a connection wherein the sealing surfaces are positioned so as to avoid failure due to contamination or deterioration of the seal surfaces during handling.

Still another object of the invention is the incorporation of the above advantages into a pin and box connection for straight well liner tubing.

These and other objects of my invention are accomplished through a novel combination of features which utilizes structural seal combinations which are not only redundant but also mutually supporting at the respective inner and outer seals. The initial improvement to the joint structure is the use of multi-start helical thread paths which have entrant portions equidistantly spaced about the male pin and female box elements of the joint. The particular thread profile utilizes a reverse angle load flank which is a load flank which is cut into the liner at a negative angle relative to the fill, thereby locking the pin and box against radial separation along the threaded region. Liner manufacturers provide liners within reasonable tolerances; however the inner and outer diameters vary eccentrically throughout the tube resulting in non-uniform thickness of the pipe wall. The cross sectional area under the last engaged thread on both the pin and the box where all the tension load on the joint is acting is called the "critical area" of the connection and normally will fracture at very high tension loads. This is only true if the two members do not "jump out" thereby disengaging. The superiority of this invention over all other threads with locking reverse angle load flanks is that multiple starting helixes spaced equidistantly apart around the 360° circumference prevent differential strain rates caused by the sudden one-sided discontinuity of single start threads. This faster strain rate precipitates once the material reaches a yield condition at which the material stretches much further with the same increment increase of load that it did formerly when the load applied produced only elastic strain. These beyond yield strain conditions will occur first just beyond the last point of threaded engagement around the helix. Because there is sudden loss of the thread helix as a single path thread terminates on the pin (or starts on the box), this region begins to strain faster or "plastically" than the wall just before the thread discontinuity. As a result there is an overbalance of strain on one side leading to a premature fracture on that side. This has been noticed on repeated tests and it is a phenomenon that reduces the load bearing capacity of the joint. However, by introducing two separate thread helixes that start and finish 180° apart, the load the connection will carry has found to increase. The breaks have been uniform, occurring cleanly through the cross section. This increase in strength is made possible by balancing the two areas of greatest strain, that is at the thread discontinuities, at opposing sides. With twin or multiple start threads, the effect of one-sided differential strain will not degrade or weaken the tensile load capacity of each joint, and the probability of failure will be much less, and non-existent if the rated loads are not exceeded. Although there is some interference along the thread this interference is not relied on as a seal. The actual sealing occurs at each end of the thread through additional sealing mechanisms. It must be further noted that the locking of both members using the reverse angle threads naturally increases the strength of the connection beyond that predicted by the critical area. As the material in the inner member strains beyond yield it is restrained by the box material which has not yet reached the yield point. Until it can carry the box with it into yield the pin will not be able to strain enough to reach the fracture point. Conceptually the pin borrows extra strength from the Box. This borrowing action boosts the effective area by 10% to 25% over conventional non-locked threads as borne out by FEA (Finite element analysis) and physical testing. The variance of strength is dependent on a number of factors such as thick-thin variation, average thickness of the area in relation to the box member, and material properties. With non-locking threads, high loads cause yielding in the pin (or box) followed by necking and slipping out of engagement, bringing the whole tension load to bear totally on the weakest member.

Adjacent to the end of the threads internal to the joint connection is a primary internal seal which is an interference seal between the inner diameter of the box adjacent its shoulder and the outer diameter of the pin adjacent its nose. The pin nose does not abut the box shoulder and the sealing surface carried by the pin nose is cut away or beveled to prevent scarring or damaging of the edge of the sealing surface during handling and connection. Immediately adjacent the primary internal seal, a seal ring groove is formed in the box and a thermoplastic seal ring is compressed therein. As noted hereinabove conventional use of a thermoplastic seal ring results in a degradation of the metal-to-metal interference seals. Consequently, when the thermoplastic seals are conventionally used they are displaced a distance from the interference seals. In my invention the thermoplastic seal ring is immediately adjacent the primary internal interference seal, yet degradation of this seal does not occur because the reverse angle thread profile extends to the seal ring groove and the locking action of these threads in proximity to the primary internal seal prevents the thermoplastic seal ring from urging the interference seal apart.

The external seal or secondary seal structure, located proximal the outside of the joint connection, includes an interference seal and a torque shoulder seal. The outer surface of the pin adjacent the pin shoulder has a stepped diameter with a ramp surface connecting a lower surface with an upper landing surface. The outside diameter of the landing surface is greater than the inside diameter of the box in the region, thus as the pin and box move axially relative to one another the box is deflected radially along the ramp creating very high bearing pressure in the ramp/landing surface area. The pin shoulder is formed at a negative draft angle with respect to the outer surface of the liner and the box lip is formed at the same angle such that further axial movement between the pin and box forms a radical clamp seal in addition to the torque shoulder seal formed therebetween.

BRIEF DESCRIPTION OF THE DRAWINGS

Apparatus embodying features of my invention are depicted in the accompanying drawings, which form a portion of this application, and wherein.

DESCRIPTION OF A PREFERRED EMBODIMENT

Figure 1:
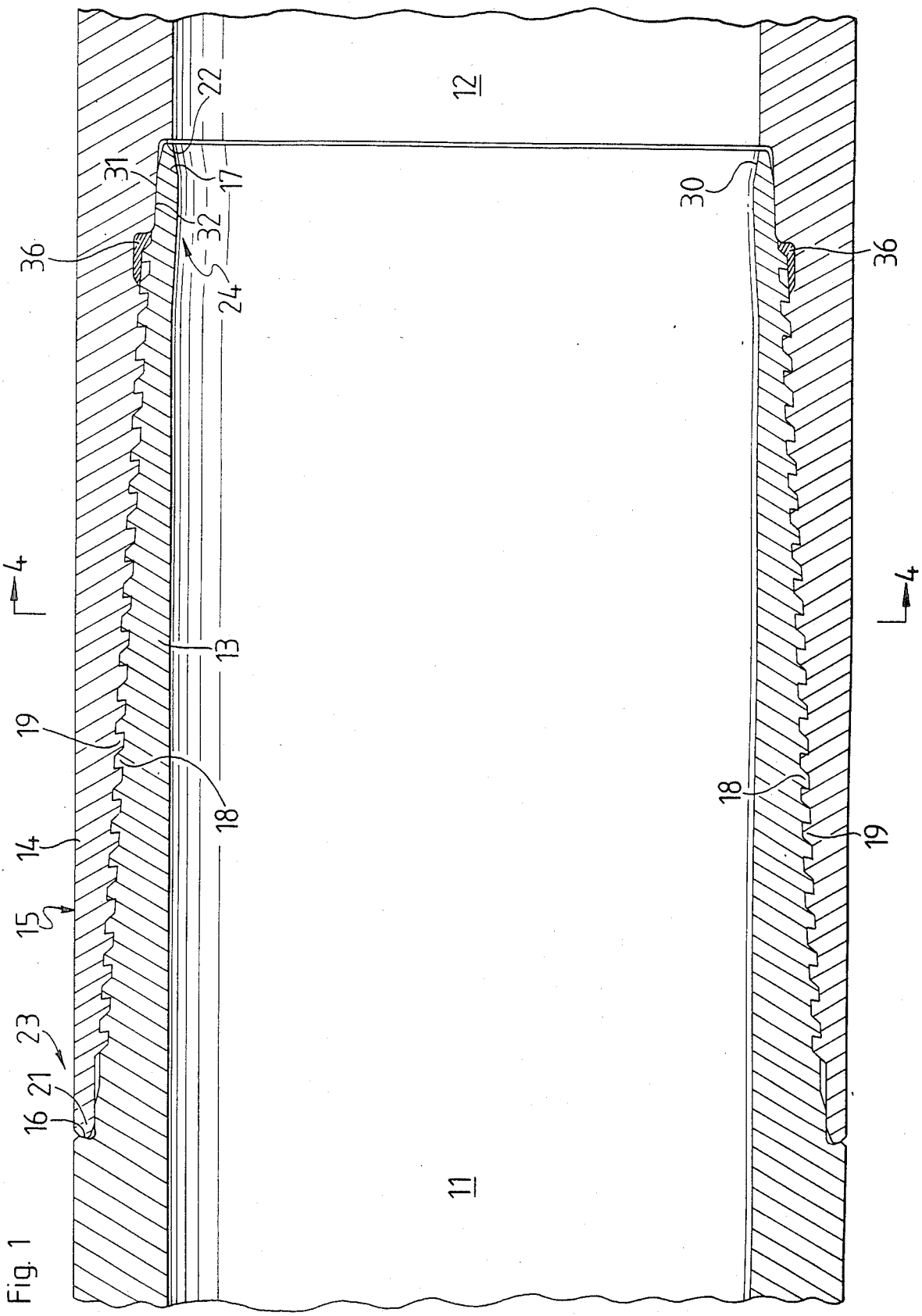
FIG. 1 is a sectional view along the longitudinal axis of my connection showing the pin and box fully engaged.
Figure 2:
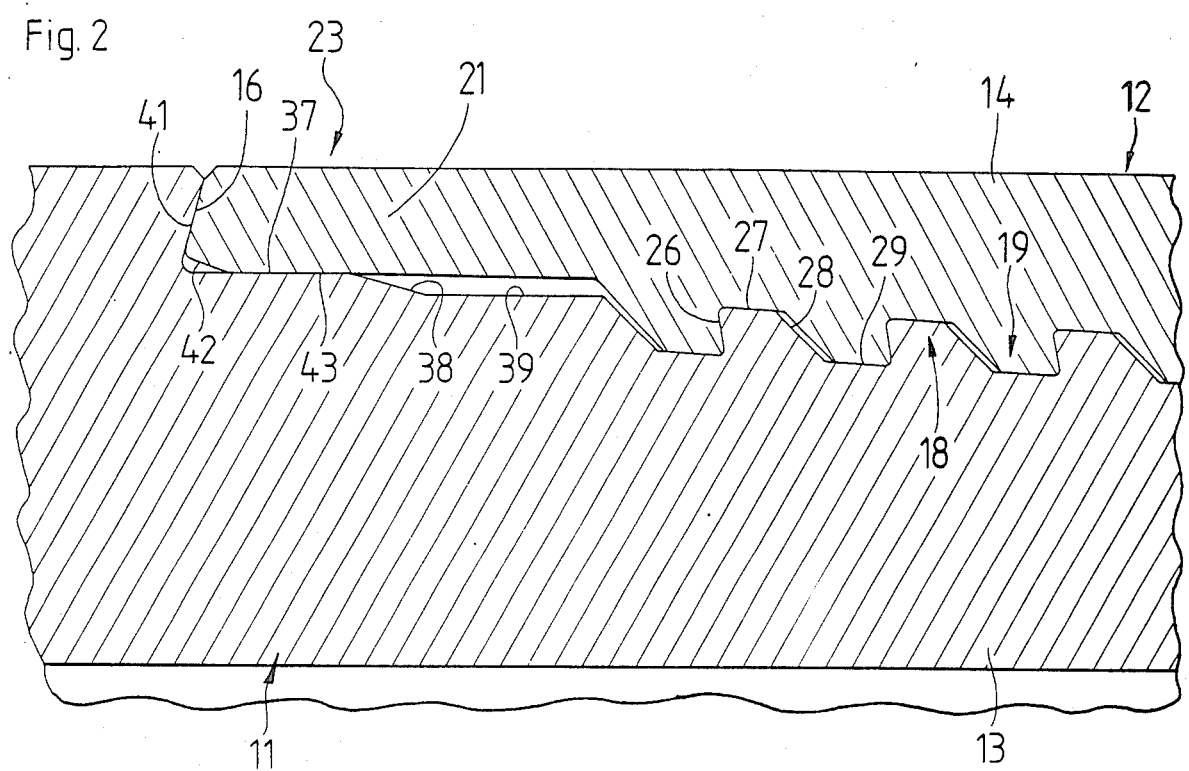
FIG. 2 is a sectional view taken along one side of the connection showing the external seal.

Referring to FIG. 1, two lengths of tubular pipe 11 and 12 are shown joined by my connection. Each tubular pipe section in a string of pipe has a male portion or pin 13 and a female portion or box 14 which cooperate to form my connection 15. The pin 13 carries an external thread 18 and extends from a pin shoulder 16 to a pin nose 17. In similar manner, the box 14 carries a cooperative internal thread 19 intermediate a box lip 21 and a box shoulder 22. FIG. 2 depicts the external seal elements 23 and FIG. 3 the internal seal elements 24 which are located on the respective ends of the threaded portions of the pin 13 and box 14.

Figure 4:
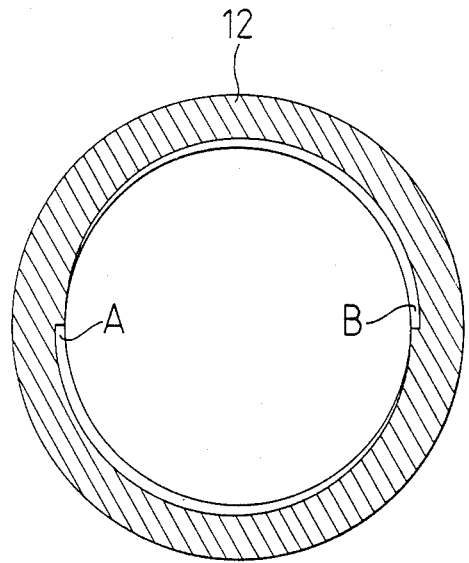
FIG. 4 is a sectional view taken along the line 4—4 of FIG. 1.

The threads 18 and 19 are multi-path helical threads with each path maintaining a constant phase with relation to the other paths. Preferably each path has an entrant portion which is equidistant from each other path about the circumference of the tubular member. Thus the thread paths are equally spaced apart at all times as shown in the sectional representation of FIG. 4 wherein a dual-path thread having paths A and B is depicted. This type thread ensures maximum thread engagement even with some eccentricity in the thickness of the casing by distributing the threads about the walls of the casing. The threads have a self-locking profile. That is to say, the threads have a load flank 26 which is formed at a negative draft angle with respect to an associated fill surface 27. This type thread is also called a reverse angle thread or locking thread because the negative draft angle of the load flank 26 prevents radial separation of the threads. The threads also have a positive stabbing flank 28 and a root surface 29.

Figure 3:
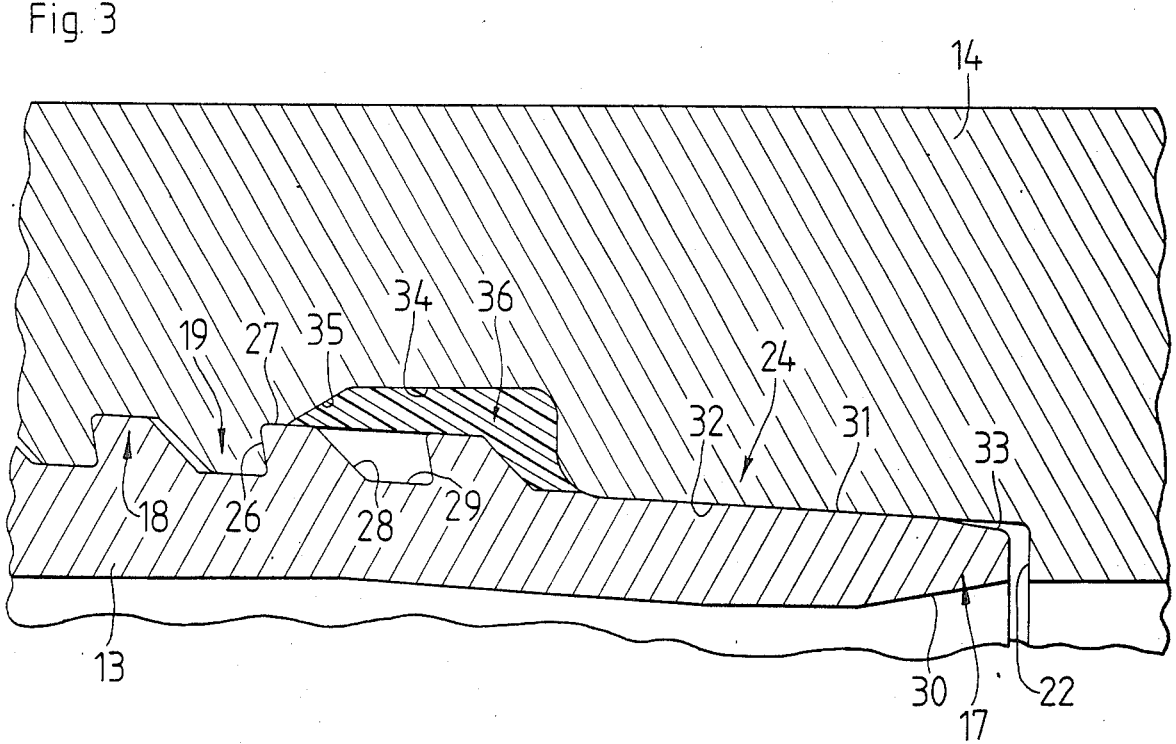
FIG. 3 is a sectional view taken along one side of the connection showing the primary internal seal and the thermoplastic seal ring.

Referring to FIG. 3, the primary internal seal of the connection 15 is formed adjacent the box shoulder 22 between a pin seal surface 31 and a box seal surface 32. This primary internal seal is an interference seal formed by the metal-to-metal contact between surfaces 31 and 32 as is well known in the art. It should be noted that the interference between these surfaces is set at a nominal value greater than the interference between the mating surfaces of threads 18 and 19 so as to insure that the threads 18 and 19 will not keep the seal surfaces 31 and 32 from mating with adequate bearing pressure to form a seal. The pin nose 17 is beveled on its inner diameter as at 30 to prevent internal obstruction of the tubular members. Pin seal surface 31 is beveled near the end of the pin nose 17 to form a cut-away surface 33 to decrease the likelihood of damage to this region of the seal surface affecting the seal integrity. In other words, damage to the pin seal surface 31 is most likely to occur in the area of cut-away surface 33 which is not a sealing surface. The cut-away surface 33 also decreases the length, L, of the sealing surfaces, thus the forces caused by the interference between the surface 31 and 32 are concentrated into a smaller area thereby the bearing pressure is increased per unit area such that $$P \alpha F/L \times D$$

where
P is the unit bearing pressure, F is the interference forces, L is the length of the interfering surfaces, and D is the interface diameter between surfaces.

A seal ring groove 34 is formed in the box intermediate and adjacent the box seal surface 32 and the thread 19. The seal ring groove 34 is at least as wide as maximum width of the thread groove and has a forward surface 35 such that it forms an oblique angle with respect to the stabbing flank 28 of the thread 18 to prevent galling or cutting into these surfaces. Within the groove 34 is a thermoplastic seal ring 36, typically a fiberglass-filled virgin Teflon ® material or the like. As is well known, when such seal rings are placed in pipe connections the pressures necessary to extrude the ring into the appropriate voids also tend to cause the connection to separate radially, therefore conventional wisdom dictates separating the thermoplastic seal ring 36 from the primary interference seal. In my connection, these seals are utilized adjacent one another because the reverse angle threads 18 and 19 lock the connection 15 together and prevent radial separation of the seal surfaces 31 and 32 causing the thermoplastic seal ring 36 to extrude axially along the connection. Thus, when the combination of entrance seal, thermoplastic seal ring, and reverse angle threads is used an interference gradient exists from the cut-away surface 33 to the threads 18 and 19 such that the bearing pressure is actually increased therealong between the adjacent surfaces. The integrity of the primary internal seal structure has been tested by introducing pressures equivalent to deep well pressures between the threads 18 and 19 with no seal leakage occurring as a result. The strength of the seal exceeds the bursting pressure of the tubular pipe.

Figure 5:
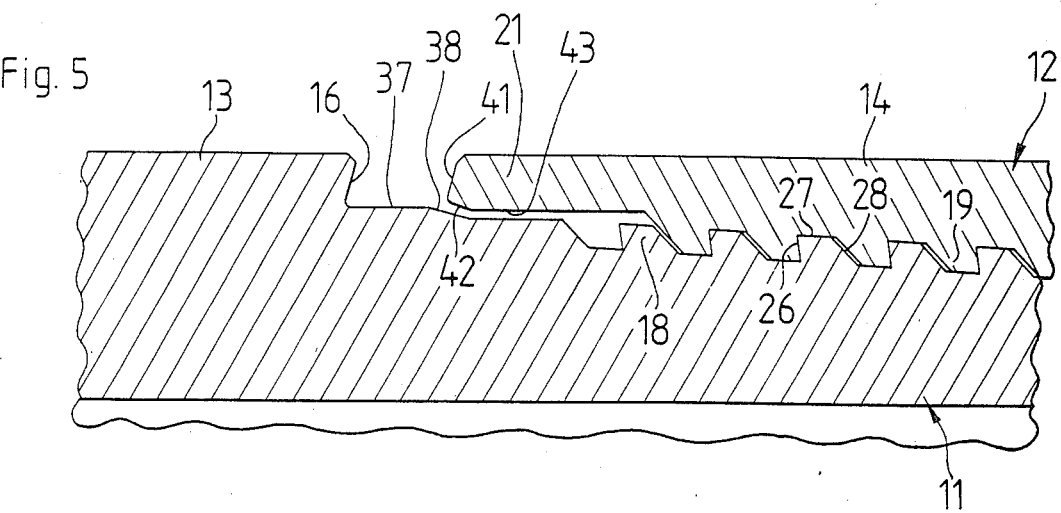
FIG. 5 is a sectional view of the external seal showing the pin and box partially engaged; and, FIG. 6 is a sectional view of the external seal showing the box nose engaging the ramp surface.
Figure 6:
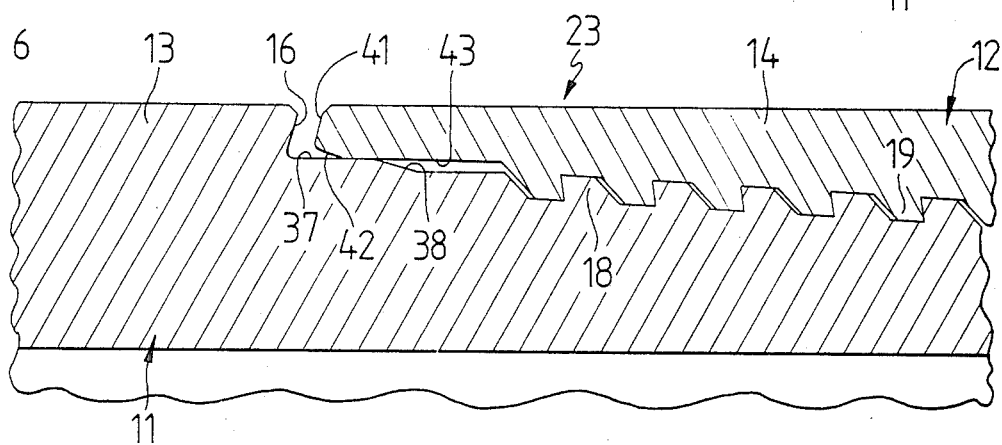

Referring now to FIG. 2, the external seal structure is formed at the opposite end of the threaded portion of the connection 15 proximal the exterior of the tubular members. Pin shoulder 16 is also a negative draft surface with respect to the surface of the tubular member 11. A landing surface 37, generally parallel to the axis of the connector 15, is formed adjacent the pin shoulder 16 and serves as a seal surface. A ramp surface 38 extends from the landing surface 37 and further decreases the diameter of the pin 13 to an intermediate surface 39 adjacent thread 18. The box lip 21 terminates in a mating surface 41 inclined at the same angle as pin shoulder 16 such that the shoulder 16 and mating surface 41 form a torque shoulder seal when fully engaged. A beveled cut-away surface 42 connects the mating surface 41 to a secondary sealing surface 43 inside box 14. The secondary sealing surface 43 extends to the beginning of the threads 19 and has a diameter slightly smaller than the landing surface 37 so as to interfere therewith. Thus referring to FIGS. 5, 6 and 4 as a series, it may be seen that as the tubular members 11 and 12 are rotated the cut-away surface 42 is urged against ramp surface 38 and the box lip 21 undergoes a slight radial deflection. This action generates very high bearing pressures in the area which are enhanced by further rotation of the tubular member such that mating surface 41 engages pin shoulder 16 and is urged radially inward. Thus a radial clamping seal is formed by which the box lip 21 is locked in against radial distention and the bearing pressure at the interference between the landing surface 37 and the secondary seal surface 43 is maintained. Thus the external seal structure is characterized by a high pressure interference seal formed at the junction of the landing surface 37 and the secondary seal surface and a torque shoulder seal which locks the box lip 21 against radial disengagement and reinforces the locking action of the reverse angle threads proximal the external seal.

It may thus be seen that the connection 15 utilizes four separate seals in combination with a locking thread which enhances the cooperation of the separate seals such that a thermoplastic seal ring may be used in conjunction with an interference seal in the primary internal seal structure in a unique manner and a high bearing pressure interference may be locked against radial separation in the external seal structure. The expedient of using cut-away surfaces at the pin seal surface 31 and secondary seal surface 43 improves the seal performance while assuring that damage occurring at these terminal portions during make-up does not threaten the integrity of the seal.

While I have shown my invention in but one form, it will be obvious to those skilled in the art that it is not so limited, but is susceptible of various changes and modifications without departing from the spirit thereof.

What I claim is:

1. A multi-seal pin and box connection for tubular members comprising:
   (a) a multi-groove helical thread with each groove having an entrant portion equidistant with adjacent groove entrant portions and with each groove including a negative draft load flank;
   (b) a seal ring groove formed in the box portion of said connection immediately adjacent the innermost thread thereof for carrying a deformable thermoplastic seal therein such that the said pin portion's thread extends into said seal ring groove compressing said seal ring; and
   (c) a primary interference seal formed between said pin and box immediately adjacent said seal ring groove.

2. A connection as defined in claim 1 wherein said entrant portions are located on opposite sides of said tubular members.

3. A connection as defined in claim 1 wherein said seal ring groove has a width at least equal to the maximum groove width of said thread.

4. A connection as defined in claim 1 wherein the outer diameter of said pin and the inner diameter of said box are beveled proximal the respective terminal portions.

5. A connection as defined in claim 4 wherein said pin has a reduced inner diameter adjacent the terminal end thereof.

6. The connection as defined in claim 1 including an annular thermoplastic seal carried within said seal ring groove such that said thermopoastic seal is deformed axially along said threads by compression thereby with said negative draft load flanks locking said tubular members together to prevent separation thereof due to said compression.

7. The connection as defined in claim 1 further comprising a clamping radial seal formed between the terminal portion of said box and said pin.

8. The connection as defined in claim 7 wherein said clamping radial seal comprises:
   (a) an annular shoulder formed proximal the outer diameter of said pin having a negative draft with respect to the outer surface of said tubular member;

(b) an annular mating surface formed on the open end of said box inclined at the same angle as said annular shoulder for sealing therewith;

(c) a landing surface formed on said pin adjacent said annular shoulder and generally parallel to the axis of said tubular member;

(d) a ramp surface formed on said pin adjacent said landing surface and inclined at a predetermined angle toward the axis of said tubular member; and (e) an interfering surface formed in said box proximal said annular mating surface and generally parallel to the axis of said tubular member, with said interfering surface engaging said landing surface to form an interference seal therewith.

9. The connection as defined in claim 8 wherein said interfering surface has a diameter slightly smaller than the diameter of said landing surface such that relative axial movement of said box and pin causes said box to be deflected radially by said ramp surface and upon further relative axial movement thereof to be deflected inwardly by said annular shoulder.

10. The connection as defined in claim 8 wherein said box is beveled intermediate said interference surface and said annular mating surface.

11. A multi-seal pin and box connection comprising:
(a) a multi-groove helical thread with each groove having an entrant portion equidistant with adjacent groove portions and with each thread and groove comprising a root, a fill, a reverse angle load flank and a positive stabbing flank with said threads interfering along said root, fill, and load flank;

(b) a seal ring groove formed in the box portion of said connection immediately adjacent the innermost thread thereof for carrying a deformable thermoplastic seal therein such that the said pin portion's thread extends into said seal ring groove compressing said seal ring with said seal ring groove having a forward surface inclined at an acute angle to the axis of said tubular member such that said forward surface forms an oblique angle with an adjacent stabbing flank; and (c) a primary interference seal formed between said pin and box immediately adjacent said seal ring groove.

12. A multi-seal pin and box connection for tubular members comprising:
(a) cooperative multi-groove helical threads formed in said box and pin with each groove having an entrant portion equidistant from adjacent groove portions with each groove including a negative draft load flank defining a negative draft thread;

(b) a primary internal seal formed by interference between the outer diameter of said pin and the inner diameter of said box proximal the innermost threaded engagement thereof;

(c) a seal ring groove formed in said box intermediate said threads and said inner diameter forming said primary internal seal such that the thread of said pin extends into said seal ring groove for compressing a deformable thermoplastic ring carried therein;

(d) an external seal formed by interference between the outer diameter of said pin and the inner diameter of said box proximal the outermost threaded engagement thereof wherein the outer diameter of said pin at said seal is greater than the inner diameter of said box at said seal; and (e) a torque shoulder seal formed by opposing terminal surfaces of said box and pin intermedite said external seal and the outer surface of said tubular members.

13. The connection as defined in claim 12 wherein said torque shoulder seal comprises:
(a) an annular shoulder forming a negative draft angle with respect to the outer surface of said tubular members and defining one end of said pin of said connection; and (b) an annular mating surface formed at the terminal end of said box inclined at the same angle as said annular shoulder to form a seal when forced into abutment therewith by relative rotation of said pin and box.

14. The connection as defined in claim 12 wherein said outer diameter of said pin at said external seal comprises:
(a) a landing surface having a diameter greater than the inner diameter of said box at said external seal; and (b) a ramp surface connected to said landing surface and inclined toward the axis of said tubular member.

15. The connection as defined in claim 12 wherein said seal ring groove has a width at least as great as the maximum groove width of said threads, such that an extrudable thermoplastic annular ring may be contained in said groove and extruded along said thread.

16. The connection as defined in claim 12 wherein said seal ring groove contains an extrudable thermoplastic annular ring such that an increasing interference gradient is created along said tubular member from said primary internal seal to said negative draft threads by the combined action of engagement of said negative draft threads with each other, said primary internal seal, and said thermoplastic seal.

17. The connection as defined in claim 12 wherein said outer diameter of said pin is beveled at the end thereof such that the length, L, of said primary internal seal is decreased and that the bearing pressure P per unit area of the primary internal seal is increased according to the formula $F/L\alpha P$ where F is the force required to seat the seal surfaces.

18. The connection as defined in claim 12 wherein the inner surface of said pin is beveled proximal the end of said tubular member adjacent said primary internal seal.

19. A connection for joining tubular members having one end configured as a pin and another end configured as a box, comprising:
(a) cooperative multi-groove helical threads formed in said pin and box, and having a reverse angle load flank;

(b) interference means for forming a primary internal seal proximal said threads;

(c) means for confining a thermoplastic annular seal between said pin and box intermediate said threads and said interference means such that said thermoplastic annular seal is compressed by said threads immediately adjacent said primary internal seal;

(d) ramp means for radially deflecting the terminal portion of said box to form a secondary interference seal at the junction of said pin and box whereat said pin has a larger outside diameter than the inside diameter of said box; and (e) shoulder means for urging said deflected portion of said box toward the axis of said tubular members and retaining said deflected portion against radial expansion.

* * * * *